(12) United States Patent
Jung

(10) Patent No.: US 7,495,826 B2
(45) Date of Patent: Feb. 24, 2009

(54) HYBRID INTEGRATED OPTICAL COMMUNICATION MODULE COMPRISING SILICON-RICH SILICON OXIDE OPTICAL AMPLIFIER, AND METHOD FOR FABRICATING SAME

(75) Inventor: Sun-Tae Jung, Anyang-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 668 days.

(21) Appl. No.: 10/959,854

(22) Filed: Oct. 6, 2004

(65) Prior Publication Data

US 2005/0141078 A1  Jun. 30, 2005

(30) Foreign Application Priority Data

Dec. 30, 2003  (KR) ................ 10-2003-0100214

(51) Int. Cl.
*H01S 5/00* (2006.01)
*H04B 10/12* (2006.01)
(52) U.S. Cl. .................. 359/344; 372/50.22; 385/130
(58) Field of Classification Search ............. 359/333, 359/344; 372/50.22; 385/130
See application file for complete search history.

(56) References Cited

U.S. PATENT DOCUMENTS

| | | | | |
|---|---|---|---|---|
| 4,074,299 | A * | 2/1978 | Kusano et al. | 257/93 |
| 2003/0190108 | A1* | 10/2003 | Shin et al. | 385/14 |
| 2004/0136681 | A1* | 7/2004 | Drewery et al. | 385/142 |
| 2004/0151461 | A1* | 8/2004 | Hill | 385/129 |
| 2004/0214362 | A1* | 10/2004 | Hill et al. | 438/33 |
| 2004/0252738 | A1* | 12/2004 | Hill | 372/43 |

OTHER PUBLICATIONS

Kik et al., "Gain limiting processes in Er-doped Si nanocrystal waveguides in SiO2", Journal of Applied Physics, vo. 91, No. 1, pp. 534-536 (Jan. 1, 2002).*

Seo et al. "Rare-earth-doped nanocrystalline silicon: excitation adn de-excitation mechanisms and implications for waveguide amplifier applications", Proceedings of SPIE, vo. 4282, pp. 174-184 (2001).*

* cited by examiner

*Primary Examiner*—Eric Bolda
(74) *Attorney, Agent, or Firm*—Cha & Reiter, LLC

(57) ABSTRACT

An optical signal amplifier capable of compensating the attenuation of optical signals during transmission is provided. The optical signal amplifier includes: a substrate having first and second surfaces opposing each other and a recess formed on the first surface; an LED (light emitting diode) mounted within the recess to output pumping light; and an SRSO (silicon rich silicon oxide) optical amplifier for amplifying an input optical signal using the pumping light and outputting the amplified signal.

7 Claims, 4 Drawing Sheets

HYBRID INTEGRATED OPTICAL COMMUNICATION MODULE COMPRISING SILICON-RICH SILICON OXIDE OPTICAL AMPLIFIER, AND METHOD FOR FABRICATING SAME

CLAIM OF PRIORITY

This application claims priority to an application entitled "Optical Signal Amplifier, Optical Communication Module Comprising Same and Method for Fabricating Same," filed with the Korean Intellectual Property Office on Dec. 30, 2003 and assigned Serial No. 2003-100214, the contents of which are hereby incorporated by reference.

BACKGROUND OF THE INVENTION

1. Field of the Invention

The present invention relates to an optical signal amplifier for compensating the attenuation of optical signals during transmission and, more particularly, to an optical signal amplifier capable of being hybridly integrated, an optical communication module comprising the amplifier, and a method for fabricating the amplifier.

2. Description of the Related Art

Optical communication modules are less competitive in price and size if assembled from discrete optical devices, each requiring a separate package to perform a specific function in an optical communication system. To improve the price competitiveness, integration technologies are being applied to optical devices. Two primary integration technologies are hybrid integration and monolithic integration. The hybrid integration is an optical platform technology that integrates active optical devices on a platform, which is integrated with the functions of passive devices using a PLC (planar lightwave circuit) technology. In contrast, the monolithic integration is a system-on-chip technology that monolithically integrates all optical and optoelectronic components, excluding a laser diode, into a single chip through a CMOS process. Although monolithic integration achieves a much higher degree of integration, it requires sophisticated expertise. Accordingly, studies have been more actively made into hybrid-integration technologies.

An optical signal transmitted along an optical transmission line is typically changed to a reduced level of power due to optical loss of power. Once the power of the optical signal is reduced below a certain point where a receiver is unable to detect the signal, a communication error occurs. To address this problem, an optical amplifier is arranged between the transmitter and the receiver for the amplification of optical signals, thereby enabling signal transmission over long distances with fewer errors.

The most commonly-used amplifier is EDFA (erbium-doped fiber amplifier), which uses a silica glass fiber doped with a rare-earth element (for example, Er). EDFA amplifies an inputted optical signal by the excitation of the doped rare-earth element using a pumping light and outputs the amplified signal. However, EDFA using an optical fiber is not suitable for hybrid integration. Further, EDFA is expensive because it uses laser having a high output over 100 mW as a pumping light source.

SUMMARY OF THE INVENTION

Accordingly, the present invention has been made to solve the above-mentioned problems occurring in the prior art and provides additional advantages, by providing an optical signal amplifier capable of being hybridly integrated and fabricated at a lower cost, an optical communication module comprising the amplifier, and a method for fabricating the amplifier.

In accordance with one aspect of the present invention, there is provided an optical signal amplifier comprising: a substrate having first and second surfaces opposing each other and a recess formed on the first surface; an LED (light emitting diode) mounted within the recess to output pumping light; and an SRSO (silicon rich silicon oxide) optical amplifier for amplifying an inputted optical signal using the pumping light and outputting the amplified signal.

Preferably, the SRSO optical amplifier may include an SRSO core layer doped with a rare-earth element, and upper and lower claddings surrounding the SRSO core layer.

Preferably, the recess may be formed to expose the SRSO optical amplifier by bulk etching of the first surface, and the etching process is performed at least twice to form the recess in a step shape.

More preferably, the core layer may be formed in a substantially spiral shape to have the highest optical-coupling efficiency per unit surface area.

In accordance with another aspect of the present invention, there is provided an optical communication module comprising: a PLC (planar lightwave circuit) platform comprising a substrate, a lower cladding and an upper cladding, into which optical devices are integrated; and an optical signal amplifier mounted on the surface of the PLC platform to be coupled optically to the core. The optical signal amplifier further comprises: a semiconductor substrate having first and second surfaces opposing each other and a recess formed on the first surface; an LED mounted within the recess to output pumping light; and an SRSO (silicon-rich silicon oxide) optical amplifier for amplifying an inputted optical signal using the pumping light and outputting the amplified signal.

Preferably, the SRSO optical amplifier may include an align key for optical alignment with the PLC platform.

In accordance with yet another aspect of the present invention, there is provided a method for fabricating an optical signal amplifier, comprising the steps of: (a) forming a lower cladding on the first surface of a silicon substrate; (b) forming an SRSO (silicon-rich silicon oxide) core layer doped with a rare-earth element on the lower cladding; (c) patterning the SRSO core layer to have the highest optical-coupling efficiency per unit surface area; (d) forming an upper cladding on the patterned SRSO core layer; (e) forming a recess on the second surface opposing the first surface of the silicon substrate by bulk etching; and (f) mounting an LED within the recess.

Preferably, step (e) should include bulk-etching the second surface of the silicon substrate to expose the lower cladding and forming the recess in a step shape by a photolithography process performed at least twice.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Figure 1:
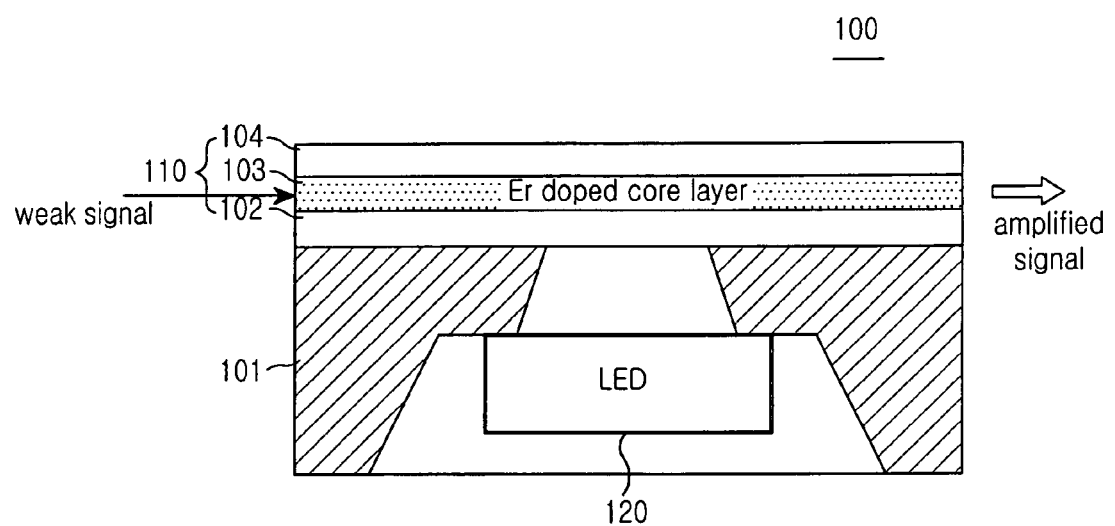
FIG. 1 is a view showing the structure of an optical signal amplifier according to the present invention.

Hereinafter, an embodiment of the present invention will be described with reference to the accompanying drawings. In the drawings, the same element, although depicted in different drawings, will be designated by the same reference numeral or character. For the purposes of clarity and simplicity, a detailed description of known functions and configurations incorporated herein will be omitted as it may make the subject matter of the present invention unclear.

FIG. 1 shows the structure of an optical signal amplifier according to the embodiment of the present invention.

As shown, as a surface-mount optical amplifier, the optical signal amplifier 100 according to the present invention includes a substrate 101, an SRSO (silicon-rich silicon oxide) optical amplifier 110, and an LED 120.

The SRSO optical amplifier 110 includes a core 103 and lower and upper claddings 102 and 104 surrounding the core 103. The core 103 is formed by $SiO_2$, which is doped with a rare-earth element (for example, Er) and has a silicon nanocrystal formed therein. The rare-earth element doped $SiO_2$ amplifies an inputted optical signal due to the excitation of the rare-earth element pumped by external pumping light. The $SiO_2$ core is different from EDFA in that Si nanocrystal is formed in $SiO_2$. Si nanocrystal acts as a carrier-trapping site and forms a large continuous-absorption cross section. Thus, Si nanocrystal is effective for broadband top pumping.

Note that the longer the waveguide made of the core 103 and claddings 102 and 104, the higher amplification efficiency it exhibits. Accordingly, the waveguide is formed in a shape that provides the highest efficiency of amplification per unit surface area, for example, in a spiral shape. In order to reduce the bending loss of the waveguide, the refractive index and radius of the waveguide are adjusted to form a smoothly-curved spiral shape.

The lower cladding 102 is formed by $SiO_2$. The upper cladding 104 is formed by $SiO_2$ with an additive for controlling the melting point and the refractive index of the waveguide.

The LED 120 for providing pumping light to the surface of the SRSO optical amplifier 110 is mounted within a recess that is formed on the substrate 101 by bulk etching adjacent to the SRSO optical amplifier 110. The LED 120 can be formed in either a package or a chip.

FIGS. 2a to 2e show the process of fabricating an optical signal amplifier according to the present invention.

Figure 2A:
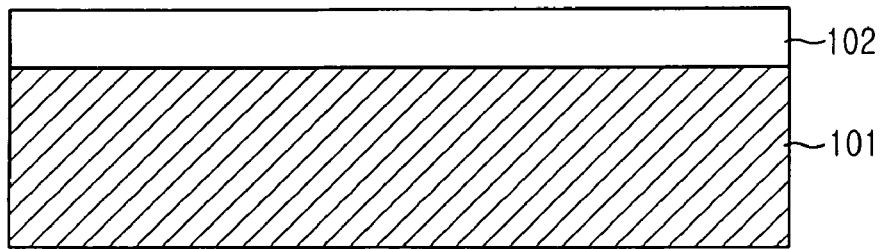
FIGS. 2a to 2e are views showing the process of fabricating an optical signal amplifier according to the present invention; and, FIG. 3 is a view showing an application of the present invention.

Referring to FIG. 2a, an $SiO_2$ lower cladding 102 is formed on a silicon substrate 101 by a process, such as thermal oxidation, FHD (flame hydrolysis deposition), PECVD (plasma-enhanced chemical vapor deposition), or LPCVD (low-pressure chemical vapor deposition).

Figure 2B:
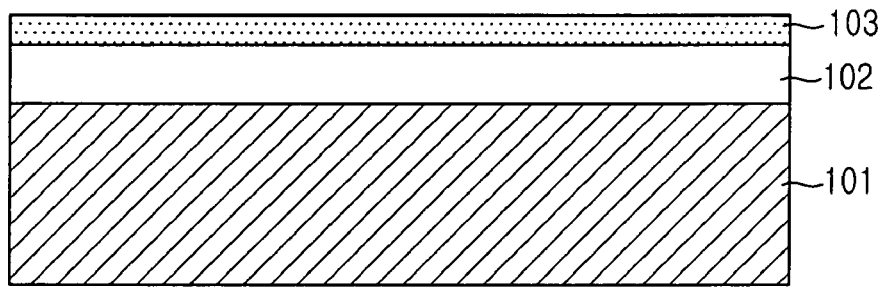

Referring to FIG. 2b, an Er-doped SRSO (silicon-rich silicon oxide) core layer 103 is deposited on the $SiO_2$ lower cladding 102 by a process, such as PECVD. Subsequently, a mask pattern is formed by photolithography to define a waveguide pattern and fabricate a waveguide by plasma etching.

Figure 2C:
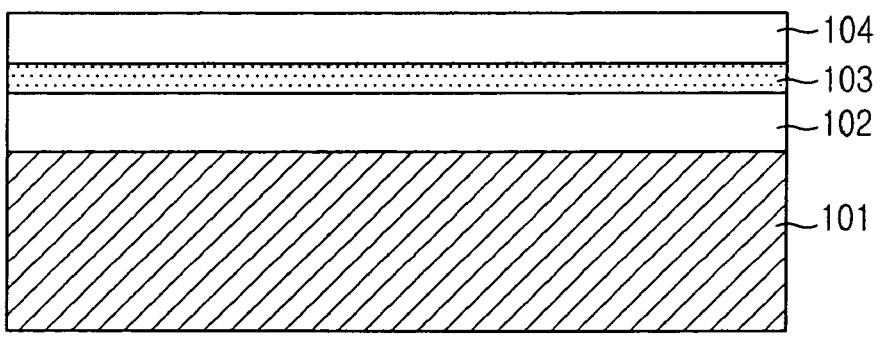

Referring to FIG. 2c, an $SiO_2$ upper cladding 104 is formed on the SRSO core layer 103 by a process, such as FHD or PECVD. At this time, a material with viscosity reduced by the addition of an additive, such as boron or phosphorus, is used for the upper cladding 104 to cover the delicate pattern of the core layer 103.

Figure 2D:
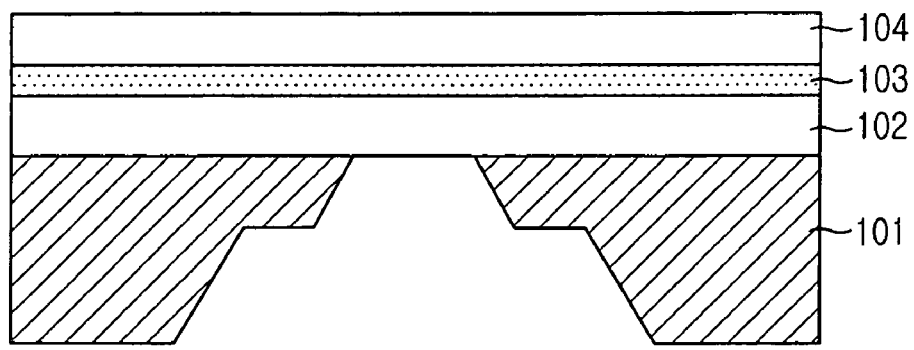

Referring to FIG. 2d, a mask pattern is formed at the rear of the silicon substrate 101 by photolithography. The rear side of the silicon substrate 101 is etched by bulk etching to form a space for mounting the LED 120 therein. In the embodiment, the space is formed in a step shape by performing the lithography process twice. Due to the space formed by the removal of the silicon substrate 101, the SRSO optical amplifier 110 is exposed to directly receive the pumping light generated from the LED 120.

Figure 2E:
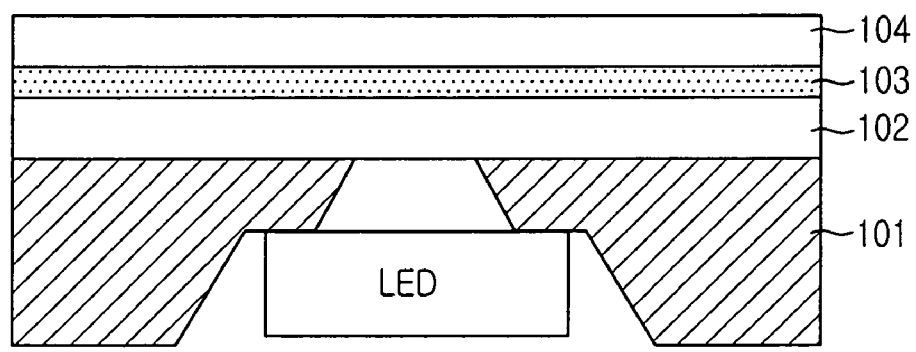

Referring to FIG. 2e, an LED package 120 is mounted within the space formed on the silicon substrate 101 by bulk etching.

Figure 3:
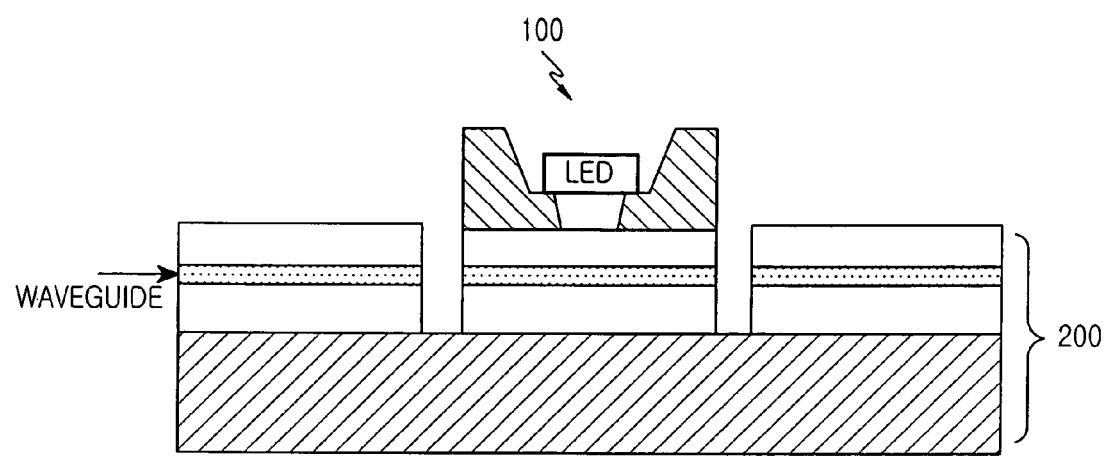

Finally, FIG. 3 shows an application of the present invention. As shown, the optical signal amplifier 100 is mounted on the surface of a PLC platform 200. To mount the optical signal amplifier 100 on the PLC platform 200, it is required to align the waveguides precisely. To this end, an align key is formed on the SRSO optical amplifier. The align key, generally in a cross or a quadrate pattern, is formed in a position readily recognizable by a lip-chip bonder.

As explained above, the present invention enables the fabrication of a surface-mounted compact package by changing the structure of an SRSO optical signal amplifier. Since the optical signal amplifier can be integrated hybridly, it is useful to fabricate complex multi-function devices requiring optical amplification. Also, the use of a non-expensive LED as a pumping light source reduces the costs of manufacturing the optical signal amplifier and the optical communication module.

Although an embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. An optical signal amplifier comprising:
    a substrate having first and second surfaces opposing each other and a recess formed on the first surface, said recess being formed as a step shape, having at least two stairs;
    an LED (light emitting diode) mounted within the recess to output pumping light transversally to said lower cladding; and,
    an SRSO (silicon-rich silicon oxide) optical amplifier formed on the second surface of the substrate for amplifying an input optical signal using the pumping light, wherein the LED is laid over an inner one of the two stairs and a bottom of the recess is distanced from the LED.

2. The optical signal amplifier according to claim 1, wherein said SRSO optical amplifier includes:
    an SRSO core layer doped with a rare-earth element; and
    upper and lower claddings surrounding the SRSO core layer, wherein the substrate is in contact with the lower cladding and the LED outputs the pumping light transversally to the lower cladding.

3. The optical signal amplifier according to claim 1, wherein said recess is formed to expose the lower cladding of the SRSO optical amplifier through a bulk etching of the first surface.

4. The optical signal amplifier according to claim 2, wherein said core layer is formed in a substantially spiral shape to yield a highest optical coupling efficiency per unit surface area.

5. The optical signal amplifier according to claim 2, wherein said upper and lower claddings include $SiO_2$.

6. An optical communication module comprising:
a PLC (planar lightwave circuit) platform comprising a substrate, a lower cladding and an upper cladding and a core layer between the lower and upper claddings, into which optical devices are integrated; and
an optical signal amplifier mounted on the surface of the PLC platform,
wherein said optical signal amplifier comprises:
- a semiconductor substrate having first and second surfaces opposing each other and a recess formed on the first surface, said recess being formed in a step shape having at least two stairs;
- an LED mounted with the recess to output pumping light; and
- an SRSO (silicon-rich silicon oxide) optical amplifier formed on the second surface of the semiconductor substrate for amplifying an input optical signal using the pumping light, wherein the LED is laid over an inner one of the two stairs and a bottom of the recess is distanced from the LED.

7. The optical communication module according to claim 6, wherein said SRSO optical amplifier includes an SRSO core layer doped with a rare-earth element and an align key for an optical alignment with the PLC platform and the SRSO core layer of the SRSO optical amplifier is optically aligned with the core layer of the PLC platform.

* * * * *